United States Patent [19]

Frosch et al.

[11] 4,279,632

[45] Jul. 21, 1981

[54] METHOD AND APPARATUS FOR PRODUCING CONCENTRIC HOLLOW SPHERES

[76] Inventors: Robert A. Frosch, Administrator of the National Aeronautics and Space Administration, with respect to an invention of Taylor G. Wang, Glendale; Daniel D. Elleman, San Marino, both of Calif.

[21] Appl. No.: 37,072

[22] Filed: May 8, 1979

[51] Int. Cl.³ ............................................. C03B 19/10
[52] U.S. Cl. ..................................... 65/21.4; 65/22; 65/142; 264/5; 264/9; 264/24; 425/6
[58] Field of Search ..................... 65/2, 5, 16, 22, 21, 65/142, 21.4; 264/5, 22, 50, 9, 24; 425/6

[56] References Cited

U.S. PATENT DOCUMENTS

| | | | |
|---|---|---|---|
| 2,392,072 | 1/1946 | Vang | 425/6 X |
| 3,744,983 | 7/1973 | Jenkins | 65/142 X |
| 3,955,956 | 5/1976 | Terner | 65/21 X |
| 3,985,841 | 10/1976 | Turnbull et al. | 264/9 |
| 4,162,282 | 7/1979 | Fulwyler et al. | 264/9 |

OTHER PUBLICATIONS

PCT/US79/00621 Torobin, published 3/1980 priority 8/28/78.
PCT/US/79/00651 Torobin, published 3/1980 priority 8/28/78.

*Primary Examiner*—Robert L. Lindsay, Jr.
*Attorney, Agent, or Firm*—Monte F. Mott; John R. Manning

[57] ABSTRACT

Hollow spheres with precisely concentric inner and outer spherical surfaces are formed by applying vibrations to a nonconcentric hollow sphere while it is at an elevated temperature at which it is fluid or plastic, the vibrations producing internal flows which cause the inner and outer surfaces to become precisely concentric. Concentric spheres can be mass produced by extruding a material such as glass or metal while injecting a stream of gas into the center of the extrusion to form a gas-filled tube. Vibrations are applied to the extruded tube to help break it up into individual bodies of a desired uniform size, the bodies tending to form spherical inner and outer surfaces by reason of surface tension, and the continuing application of vibrations causing these surfaces to become concentric.

8 Claims, 2 Drawing Figures

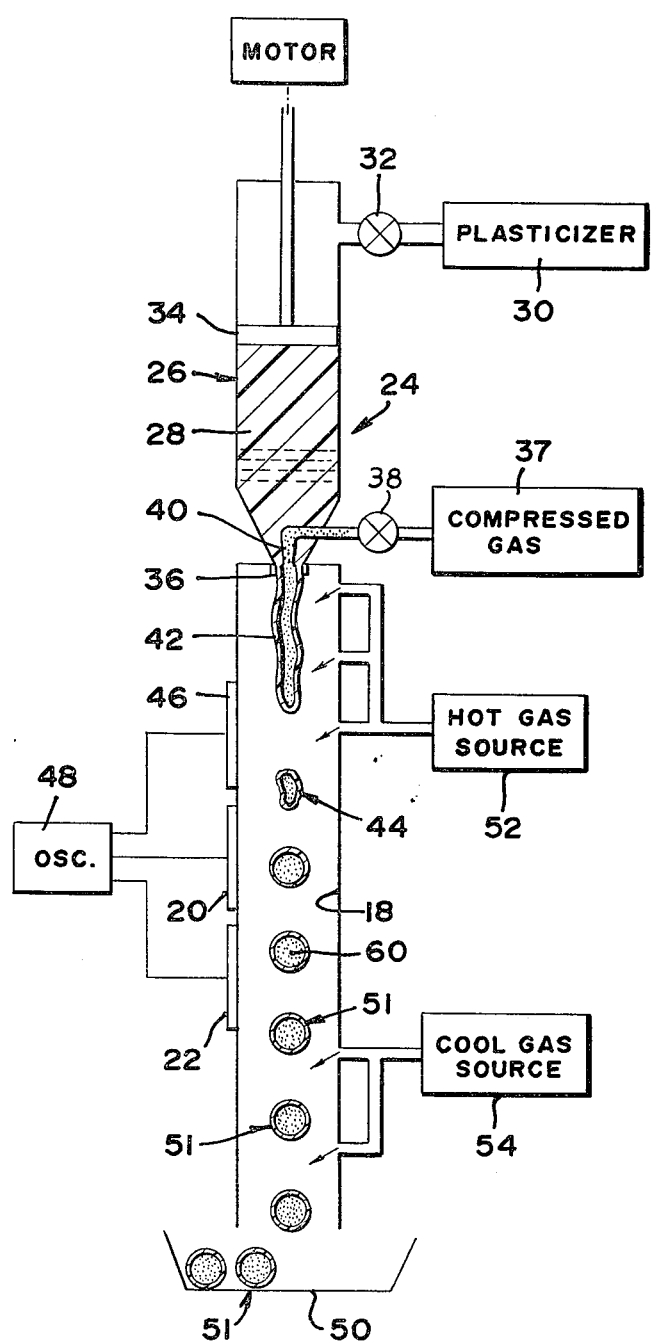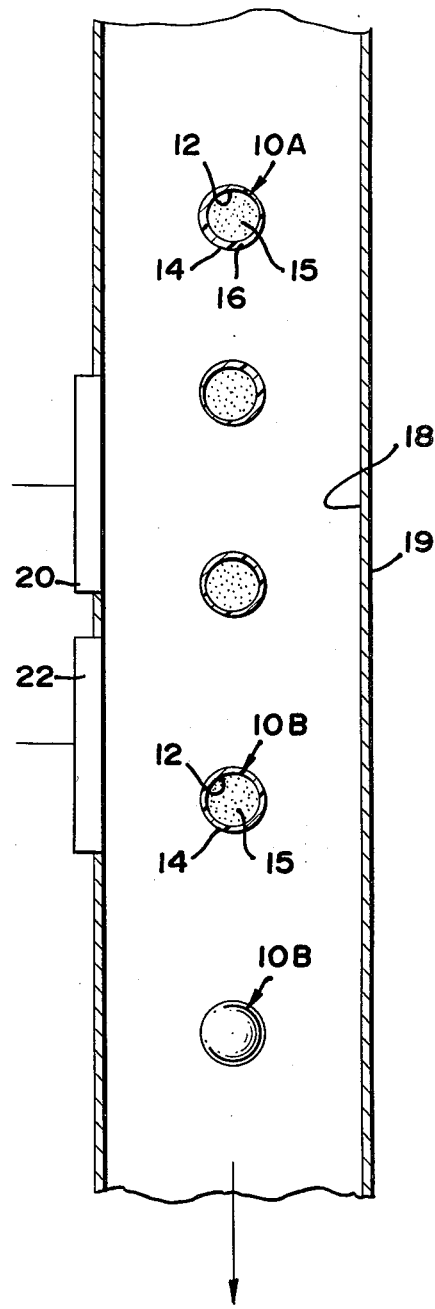

METHOD AND APPARATUS FOR PRODUCING CONCENTRIC HOLLOW SPHERES

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

In thermal nuclear fusion by inertial confinement, laser or electron beams are applied uniformly about a hollow sphere containing a gas such as a mixture of deuterium and tritium. Research on such methods has typically been conducted using glass shells of about 100 $\mu m$ (micrometer) outer diameter and 1 $\mu m$ wall thickness, although target sizes ranging from one to ten millimeters have been considered. The high intensity beams applied to the shell causes heating and vaporization of the shell, and the shell vapors cause radial compression of the fusible gas therewithin. It may be noted that ablation shells have also been suggested which ablate an exterior layer and the rest of the shell implodes by reaction forces. In any of these situations, it is important that the shells have thin walls so that they are heated to as high a temperature as possible for beams of given energy, and that the inner and outer spherical walls be precisely concentric to obtain a uniform implosion of the fusible gas within the shell. It has been found that shell forming techniques such as the dropping of gas-filled bodies through a vertical tube furnace, produces only a small percentage of precisely concentric spherical bodies. The percentage of hollow spheres with precisely concentric inner and outer surfaces decreases as the aspect ratio (ratio of outer sphere diameter to wall thickness) increases and as the diameter of the sphere increases. Glass shells with aspect ratios as high as 500:1 have been produced, but only one sphere out of many thousands that are produced will be sufficiently concentric to be usable. A concentricity which results in a maximum wall thickness no more than about 1% greater than the minimum wall thickness may be considered a minimum precision of concentricity to be acceptable in inertial confinement fusion applications. A system which produced high aspect ratio gas-filled spheres, wherein a high proportion of the spheres have precisely concentric inner and outer surfaces, would be of considerable value in the production of targets for thermonuclear fusion by inertial confinement, and in any other applications where concentric spheres were needed.

SUMMARY OF THE INVENTION

In accordance with one embodiment of the present invention, a system is provided for producing hollow spheres with inner and outer spherical surfaces that are precisely concentric. A method for producing the spheres includes establishing a hollow body at an elevated temperature at which the walls of the body are in a plastic or fluid state, and applying vibrations to the detached body. The vibrations cause internal flows of the plastic or fluid material, which have been found to result in a uniform thickness of the walls throughout the body, to produce precisely concentric inner and outer spherical surfaces.

The process of applying vibrations to the heated body, which is followed by cooling of the body, can be conducted in a substantially zero gravity environment. The substantially zero gravity helps avoid tendencies towards nonconcentricity, especially in the case of large gas-filled spheres, by avoiding a tendency for the gas bubble within the sphere to rise towards the top of the sphere. A substantially zero gravity environment also helps avoid deformations that can be produced by rapid air or other gas movement past the sphere as it falls.

The production of concentric, gas-filled hollow spheres, can be achieved by heating material so it is in a flowable state, which may be a plastic or fluid state. The heated material is extruded through the aperture of a die, while a gas stream is injected into the middle of the extrusion, to produce a hollow gas-filled tube. The tendency of the hollow tube to break up into hollow bodies can be regulated so as to produce hollow bodies of uniform size, by applying vibrations to the tube at a frequency close to the natural frequency at which the tube tends to break up. The individual hollow bodies tend to form spherical inner and outer surfaces by reason of surface tension, and the surfaces can be made concentric by continuing the application of the vibrations. The vibrations can be applied by transducers coupled to the inside of a pipe along which the hollow bodies move, with the transducers driven at a frequency that produces standing waves in the pipe. The standing wave is at a frequency that is close to the normal mode oscillation frequency of the hollow body. This standing wave produces oscillations of the hollow body, which produces flow of the flowable material in the body, which, in turn, centers the gas bubble in the body to position the inner and outer spherical surfaces concentric.

The novel features of invention are set forth with particularity in the appended claims. The invention will be best understood from the following description when read in conjunction with the accompanying drawings.

BRIEF DESCRIPTION OF THE DRAWINGS

FIG. 1 is a partial sectional view of an apparatus constructed in accordance with the invention, and illustrating a method of the invention for entering the inside surface of a hollow sphere with respect to the outside surface.

FIG. 2 is a simplified sectional view of a system which utilizes the apparatus and method of FIG. 1.

DESCRIPTION OF THE PREFERRED EMBODIMENT

FIG. 1 illustrates a method for converting an initial gas-filled hollow body 10A which has inner and outer surfaces 12, 14 that are nonconcentric, into a final hollow body 10B wherein the inner and outer surfaces are concentric. The initial hollow body 10A which contains a gas bubble 15, is formed of a material which is nonplastic, or solid, at room temperature (70° F.). The hollow body 10A is established at an elevated temperature, so that its walls 16 are in a flowable (plastic or fluid) state. The body is moved along a path through a hollow passage 18 of a tube or pipe 19 which contains a gas such as air, but with the body being free of contact with a solid support that might deform it. Transducers 20, 22 are coupled to the passage 18 to produce acoustic vibrations therein. The transducers are preferably excited at a frequency that produces a standing wave pattern within the passage 18. It has been found that the application of acoustic vibrations to the hollow body 10A while it is at an elevated temperature at which its walls are flowable, causes the walls to become concentric. The concentricity results from internal flows within the walls of the body that distribute the material uniformly. It should be noted that the formation of the inner and outer surfaces 12, 14 into spheres occurs in the absence of vibrations, as a result of surface tension. However, the spherical surfaces do not have a tendency to become precisely concentric in the absence of the application of vibrations, but do become concentric when vibrations are applied.

FIG. 2 illustrates a system 24 which can be utilized to mass produce concentric gas-filled spheres of a predetermined size. The system includes an extruder 26 which holds heated plastic 28 that is received from a heating device or plasticizer 30 through a valve 32 whenever the piston 34 of the extruder is lifted. As the piston is pushed down, it extrudes the heated plastic through an extruding die 36. Compressed gas such as a mixture of deuterium and tritium, is applied from a source 37 through a valve 38 to a nozzle 40 into the center of the extruded plastic body. Accordingly, a gas-filled tube 42 emerges from the extruder.

As the gas-filled tube 42 lengthens, it tends to vibrate and break up into individual hollow bodies such as the body 44. This is a well known phenomenon which occurs, for example, when a stream of water is ejected through a nozzle. Ths frequency at which an elongated body breaks up can be calculated by use of a Rayleigh equation or by experimentation. In order to produce a succession of hollow bodies such as 44 of uniform size, vibrations can be applied to the gas-filled tube 42 after it emerges from the die 36, and especially to the end of the tube where breakup tends to occur naturally. A transducer 46 located along the passage 18 is driven by an oscillator 48 at approximately the same frequency as the frequency at which the tube 42 tends to break up, such as slightly higher than the natural beakup frequency, to encourage uniformity of breakup and uniformity of the hollow bodies 44.

The hollow body 44 is initially of an irregular shape. However, surface tension tends to form its inner and outer surfaces 12, 14 into spheres, although the spheres are unlikely to become concentric in the absence of vibrations. The transducers 20, 22 which also can be driven from the oscillator 48, produce the vibrations which result in concentricity, as discussed above. As the hollow bodies, which are now spherical with concentric inner and outer surfaces, move along the passage 18, they are cooled so as to become hardened, and are finally collected in a container 50. The heated hollow bodies such as at 51, can be allowed to cool merely at the rate at which they radiate heat. It is also possible to utilize a hot gas source 52 to initially maintain an elevated temperature as vibrations are applied, and then to utilize a cool gas source 54 to enhance cooling thereof. It may be noted that expansion of the hollow bodies normally occurs during their movement along the passage 18, due to the utilization of a higher compressed gas pressure at the nozzle 40 than the pressure of ambient air or other gas surrounding the hollow bodies.

Although it is possible to manufacture the hollow spheres under normal gravity conditions at the earth's surface, manufacturer at low or zero gravity conditions can help avoid tendencies for nonconcentricity and deformation of the spheres. When the hollow spheres are subjected to gravity, the gas bubble 60 within each sphere tends to rise relative to the higher density walls of the sphere, so there is a tendency towards nonconcentricity. If the sphere or bubble is in free fall, it is not subject to this effect, but bubbles dropped through air are not in free fall because air resistance prevents acceleration. The air resistance on a rapidly moving shell tends to distort it, especially for larger diameter shells. The manufacture, or at least centering process, can be facilitated by performing it under substantially zero gravity conditions, wherein tendencies for the gas to rise is avoided and slow movement of the spheres can be achieved to avoid wind distortions while avoiding physical contact of a solid object with the plastic and centered spheres. A low gravity environment of less then one tenth the gravity at the surface of the earth produces an order of magnitude decrease in the effects of gravity, and may be considered to be substantially a zero gravity environment.

The frequencies at which the transducers 20, 22 and 46 are driven can be one at which standing wave patterns are set up in the tube formed by the passage 18. As is described in U.S. Pat. No. 3,882,732, a sonic frequency whose half wavelength equals the width of the passage 18, or a multiple of that frequency, can be utilized to establish a standing wave pattern. A tube 18 of square cross section instead of circular cross section can be utilized to enhance the standing wave pattern. It is possible to utilize the same frequency required to resonate the gas-filled tube, or center the hollow spheres.

The heated hollow spheres are preferably vibrated at a natural frequency of vibration to enhance internal flows that result in concentricity. The approximate natural frequencies can be calculated by the following equation:

$$W^2 = n(n-1)(n+2)(s/ra^3)$$

where W is the frequency, n is the mode of oscillation in which n=2 is the lowest mode wherein two lobes oscillate on opposite sides of the sphere and n=3 produces three lobes etc., s is the surface tension of the material, r is the density, and a is the outside radius of the sphere.

The approximate natural frequency of breakup of a fluid stream such as the extruded tube 42 can be calculated by the following equation:

$$W^2 = \frac{Ka\, I_o'(Ka)}{I_o(Ka)} (K^2 a^2 - 1) \frac{s}{ra^3}$$

where W is the frequency, s is surface tension, r is density, a is the outside radius of the tube, K is the wave number (which equals $2\pi$ times the reciprocal of the wavelength at the frequency W), $I_o$ is the bessel function, and $I_o'$ is the derivative of the bessel function. In one example, a low mode (e.g. n=2) sphere-centering frequency of perhaps 30 Hz may be utilized, but the hollow tube may have to vibrate at a higher frequency such as 60 Hz. Accordingly, the oscillator 48 may deliver a plurality of different frequencies such as 60 Hz to transducer 46 and 30 Hz to transducers 20 and 22. Both frequencies can establish a standing wave pattern in a tube of constant diameter, and it is possible to vary the diameter of the tube where slightly different frequencies are to be employed.

While acoustic waves provide a convenient method for vibrating the gas-filled spheres, it is also possible to vibrate them by a variety of other means such as electrostatic, electromagnetic (in the case of spheres formed of magnetically susceptible material), or air jets or other physical force-transmitting devices. The vibrating apparatus, whether acoustic or otherwise, can be used to impart small acceleration forces to the sphere. For example, if a sensor detects that the gas bubble of a sphere is off center to the right, an acceleration force can be applied to the sphere to accelerate it toward the right to move the bubble to the left relative to the outside surface to center the bubble.

In one experiment that has been conducted, glass spheres with nonconcentric inner and outer surfaces were made concentric by heating them and applying acoustic vibrations to them under zero gravity conditions in an aircraft flown in a zero gravity trajectory. Glass spheres of approximately one centimeter diameter were heated to approximately 700° C., and acoustic vibrations of approximately 30 Hz were applied. Spheres of approximately 10 mm outer diameter and 0.1 mm to 1 mm wall thickness which were centered by the above-described method, were found to have a wall thickness which did not vary by more than 1%.

Thus, the invention provides a method and apparatus for constructing hollow spherical bodies with precisely concentric inner and outer spherical surfaces. This can be accomplished by establishing a hollow body at an elevated temperature at which the walls of the body are in a flowable state, maintaining the body substantially free of contact with a solid support to avoid distortions and applying vibrations to the hollow body while it is at an elevated temperature and internal flows can occur. The vibrations can be applied by the application of acoustic waves, such as by the application of sound to a passageway along which the bodies move, of a frequency that establishes a standing wave pattern in the passage. The body can be maintained in an environment of substantially zero gravity, to avoid tendencies for any gas within the spherical body to rise therein, and to help avoid distortions causes by the wind flowing past the body when it is in free fall in a 1 g gravity environment. Concentric hollow spheres containing a desired gas, can be manufactured by extruding a material heated to a plastic temperature, such as glass, through a die, while injecting the desired gas into the extrusion to form a gas-filled hollow body. Uniformity of breakup of the body can be enhanced by applying vibrations thereto of a frequency close to that at which the extruded tube ends to naturally break up. The discrete hollow bodies into which the tube breaks up naturally tends to form spherical inside and outside surfaces, and these surfaces can be centered by continuing to apply vibrations to the bodies.

Although particular embodiments of the invention have been described and illustrated herein, it is recognized that modifications and variations may readily occur to those skilled in the art and consequently, it is intended that the claims be interpreted to cover such modifications and equivalents.

The embodiments of the invention in which an exclusive property or privilege is claimed are defined as follows:

1. A method for forming a hollow sphere with concentric inner and outer spherical surfaces, comprising:
   establishing a detached hollow gas-filled body at an elevated temperature at which the walls of the body are in a flowable state;
   maintaining said body substantially free of contact with a solid support; and
   applying vibrations to said hollow body while it is at an elevated temperature and free of contact with a solid to provide said concentric inner and outer spherical surfaces.

2. A method for forming a hollow sphere with concentric inner and outer spherical surfaces, comprising:
   establishing a detached hollow gas-filled body at an elevated temperature at which the walls of the body are in a flowable state;
   maintaining said body substantially free of contact with a solid support;
   maintaining said body in an environment of substantially zero gravity, to thereby avoid a tendency for gas to float towards the top of a body and uncenter the inside surface thereof; and
   applying vibrations to said hollow body while it is at an elevated temperature, free of contact with a solid support, and in an environment of substantially zero gravity to provide said concentric inner and outer spherical surfaces.

3. The method described in claim 1 wherein said step of establishing includes:
   heating a material which is solid at room temperature, to an elevated temperature at which it is at least plastic;
   forcing the heated material through an aperture so it flows as a stream therethrough while injecting a gas into the middle of the stream, to form a hollow tube filled with gas; and
   applying vibrations to the hollow tube, to help break up the tube into individual hollow bodies of substantially solid material filled with said gas;
   said hollow tube is surrounded by a gaseous medium after it exits the aperture; and
   said step of applying vibrations includes applying vibrations through the gaseous medium to portions of said tube which have exited the aperture, at substantially the same frequency at which the tube tends to break up in the absence of applied vibrations.

4. The method described in claim 1 wherein:
   said hollow body is surrounded by a gaseous medium; and
   said step of applying vibrations includes applying vibrations through the gaseous medium to said hollow body while the body and gaseous medium are substantially stationary relative to each other.

5. A method for forming a hollow shell with concentric inner and outer surfaces, comprising:
   applying acoustic vibrations through a gaseous medium to a detached hollow body which lies in the gaseous medium free of contact with a solid, and which is at a temperature at which the material of the walls of the body can flow to provide said concentric inner and outer spherical surfaces.

6. Apparatus for forming a hollow sphere with concentric inner and outer spherical surfaces, comprising:
   means for passing a succession of detached hollow gas-filled bodies which are heated to a flowable temperature, along a predetermined path; and
   means positioned beside said path for applying vibrations to said bodies while they are free of contact with a solid to provide said concentric inner and outer spherical surfaces.

7. The apparatus described in claim 6 including:
means for extruding a heated plastic material through a die;
means for injecting a gas at a pressure above ambient pressure, into the extrusion, to form a gas-filled tube that can expand; and
means for applying acoustic vibrations to said gas-filled tube, to help break it into hollow bodies of uniform size.

8. The apparatus described in claim 6 wherein:
said means for applying vibrations includes an oscillator and a transducer connected to said oscillator and positioned beside said path of said bodies to apply vibrations to said bodies.

* * * * *